United States Patent Office 2,902,269
Patented Sept. 1, 1959

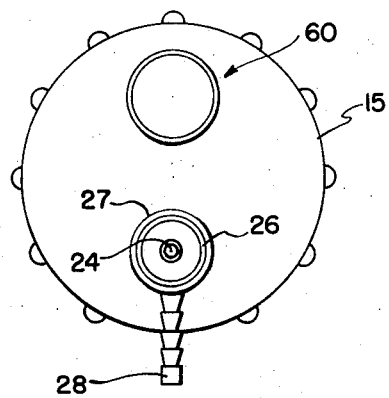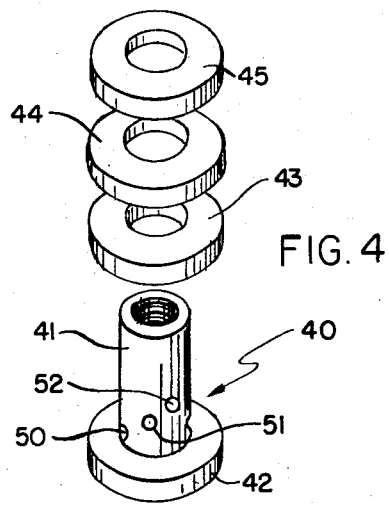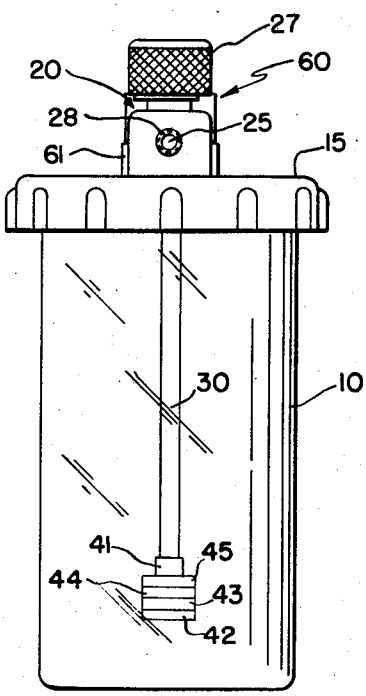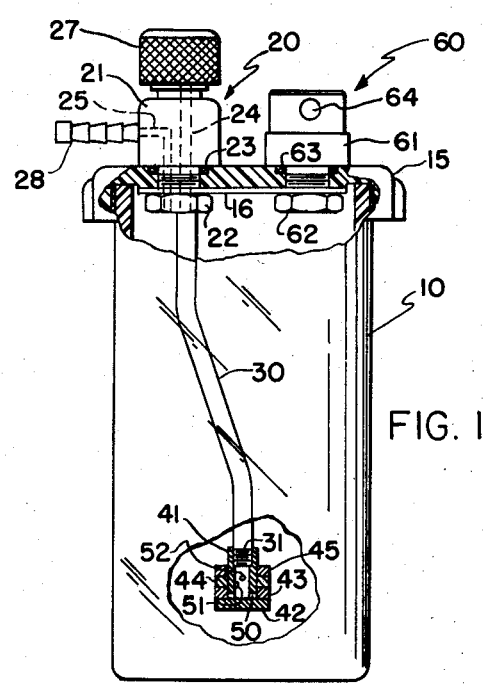

2,902,269

DIFFUSER TYPE VAPORIZER

Francis J. Eichelman, Brookfield, Ill., assignor to Chemetron Corporation, Chicago, Ill., a corporation of Delaware Application September 10, 1956, Serial No. 608,873

2 Claims. (Cl. 261—124)

This invention relates in general to vaporizers and more specifically to a diffuser type of vaporizer for achieving simply and efficiently optimum vaporization of liquids into gaseous fluids under pressure which enter a receptacle containing the liquid.

Applicant's vaporizer device is susceptible of many applications. It has, for example, been found to present an extremely practical apparatus for humidifying inhalant gases as well as for vaporizing liquids more volatile than water, such as ethers and other volatile organic solvents.

Heretofore diffuser type humidifiers have been made to a large extent of ceramic materials of sundry composition and possessing sufficient porosity, or of sintered or sponge metals compressed into a form of suitable size and shape. All of these have inherent shortcomings leaving much to be desired. Humidifiers utilizing ceramic diffusers, for example, tend to produce foam on the surface of the liquid. Obviously, for inhalation purposes most defoaming agents would be undesirable.

Sintered or sponge metal diffusers, on the other hand, tend to react with many gaseous fluids and liquids to form products which are insoluble in or inaccessible to ordinary cleansing agents. This is especially true in the brass or bronze type sintered metal diffusers. An accumulation of such material clogs the interstices of the diffuser resulting in a considerable lessening of its efficiency. Continued reactivity between metal and gaseous fluids necessitates ultimate replacement of the diffuser.

Another, and perhaps less obvious aspect involving the use of ceramic or porous type metal diffusers is that generally spherical bubbles of gaseous fluids of substantially uniform volume are produced. Such bubbles rise rapidly through the liquid medium and as a consequence, there is insufficient time for the gaseous fluids to attain the desired degree of saturation. The obvious result is inhalation of inadequately humidified gaseous fluids by the patient.

Likewise many of the known devices for vaporizing the more volatile liquids and solvents such as ethers and the like either rely on large masses of metals or do not obtain optimum diffusion in the process of vaporization.

Applicant's device not only makes possible optimum humidification of gaseous fluids by initially shaping the bubbles to provide maximum surface area and decreasing their velocity to lengthen the time of their contact with the liquid medium, but provides an inexpensive, virtually clog-proof diffuser susceptible of substantially infinite life and requiring little maintenance, if any. Applicant's device further provides a gaseous fluid driven vaporizer that involves a minimum of mass and is simple in construction and substantially fool proof.

It is, therefore, the principal object of this invention to provide a diffuser type vaporizer capable of achieving optimum vaporization of liquids in gaseous fluids initially under pressure.

Another object of this invention is to provide an inexpensive diffuser type vaporizer device that is simple, of minimum mass, virtually clog-proof, and which is adapted for long life and minimum maintenance.

These objects and additional advantages and features of this invention will become more readily apparent as the following description proceeds, taken in conjunction with the accompanying drawings wherein:

Fig. 1 is an elevational view of an embodiment of the apparatus with parts broken away for clarity of illustration.

Fig. 2 is another elevational view of the device illustrated in Fig. 1, at ninety degrees thereto.

Fig. 3 is a top plan view of the device illustrated in Figs. 1 and 2.

Fig. 4 is an exploded view of the diffuser device itself.

For convenience of illustration and description, a commercial application of applicant's invention in the form of a diffuser type humidifier for humidifying inhalant gases used in inhalation therapy has been illustrated and will be described below. It will be understood, however, that the principles and apparatus involved may be applied to other vaporizer devices without departing from the spirit of this invention.

Referring now in greater detail to the drawings and more particularly to Fig. 1, the numeral 10 designates a receptacle which preferably takes the form of a cylindrical jar. The receptacle 10 may be formed of glass, plastic, or other material as desired. In the preferred embodiment illustrated, it has been found preferable, particularly for medical uses in the practice of inhalation therapy, to form the receptacle 10 from a substantially non-breakable plastic material. A plastic receptacle is advantageous in preventing shattering from pressure built up in the device should for any reason the relief valve become obstructed. Also, plastic containers are generally less susceptible to breakage in the ordinary course of being handled.

The receptacle 10 is provided with a cover 15 to which the receptacle may be secured by any suitable means, such as, for example, jar type threads, not shown. The cover may be made of any material such as metal or plastic. A suitable gasket 16 may be utilized to provide a seal between the cover 15 and the rim of the receptacle 10.

In the preferred embodiment illustrated, the cover 15 is provided with an inlet and outlet assembly 20 secured by a lock nut 22 threaded to a depending portion of a housing 21. A gasket 23 may be positioned at the juncture of cover 15 and housing 21 for sealing purposes.

The housing 21 is provided with an inlet bore 24 and an outlet bore 25 each communicating with the interior of the receptacle 10. The bore 24 may be provided with connection means such as a seating member 26 provided with a knurled internally threaded nut 27. The nut 27 receives a mating male fixture fitted to one end of a conduit or hose, not shown, the other end of which is connected to a source of gaseous fluids under pressure, also not shown.

The bore 25 communicates with another conduit connecting means, preferably a barbed outlet member 28 suitably secured to housing 21. The barbed member 28 is for conventional insertion into a hose conduit for carrying off of humidified gaseous fluids.

Also secured to housing 21, as an extension of the bore 24 is a tubular member 30 through which gaseous fluids are directed into the receptacle. The lower end of tubular member 30 is preferably provided with external threads 31 adapted for engagement with a diffuser body 40 having an internally threaded tubular neck 41 and a substantially plane surfaced base 42.

The neck 41 is adapted to receive one or more members preferably in the form of washer-like bodies such as 43, 44, and 45, having appreciable weight and surfaces of substantial area. The surfaces of the washers are preferably planar and in the preferred embodiment illustrated provide adjacent surfaces when the washers 43, 44, and 45 are positioned about the neck 41. The dimensions of the washers are preferably equal to one another as well as to the base 42 of diffuser body 40. The diffuser body and the washers may be made of any suitable material such as for example, stainless steel, which is substantially non-corrodible and which will provide sufficient weight to perform the function to be described later.

The tubular neck 41 is provided with bores, preferably diametral, to form outlets 50, 51, and 52 for gaseous fluids from a source, not shown. The outlets 50, 51, and 52 are preferably stepped and staggered in spiral-like arrangement so that at least one outlet will be located approximately at the common boundary of each pair of adjacent surfaces of the washers 43, 44, and 45, and the pair of surfaces including the surface of base 42. The preferred embodiment is illustrated to have three such bores and three washers. Obviously, fewer or more of each may be provided depending on size and arrangement to obtain a given result.

It has been found that a series of outlets and a corresponding series of washers provides for any desired volumetric range of gaseous fluids that it is desired to pass through the device. At decreased flows for example, only one of the pairs of washers may part and as volumetric flow rates are increased, additional pairs open. This generally occurs in the same direction as that in which the gaseous fluids are introduced to the diffuser, in this case from top to bottom. Optimum humidification, however, may be achieved with three bores of less than 1/8 inch in diameter and three washers of less than 1 inch diameter, for flow rates of up to 15 liters per minute.

In operation, gaseous fluids under pressure come from a source and pass through tubular member 30 to the diffuser body 40, the latter being preferably positioned in the center of the receptacle 10 and well below the surface of the liquid medium. Gaseous fluids are emitted from outlets 50, 51, and 52 and at such pressures only as are necessary for lifting or parting the washers 43, 44, and 45, permitting passage of the gaseous fluids between their adjacent surfaces. The weight of the washers, on the other hand, tends to counteract the lifting force of the pressurized gaseous fluids to restore the substantially plane surfaces to their rest positions. The result is a rapid, somewhat random, fluttering action of the washers 43, 44, and 45, relative to one another and relative to the base 42.

As the gaseous fluids, which ultimately assume the form of bubbles, pass between the adjacent surfaces of the washers, the weight of the washers operates to flatten the stream of gaseous fluids creating greater surface areas for the fluids per unit volume, and decreasing velocity as the gaseous fluids are diffused in all directions into the liquid medium at the peripheral edges of the washers. In the formation of bubbles from the thus flattened stream of gaseous fluids, greater surface areas of gas are in contact with the liquid as well as greater amounts of gas particles being moved into contact with the interfaces. Consequently, the duration of contact of the gaseous fluids with the liquid is increased giving greater opportunity for sufficient accumulation of vaporized liquid. Obviously, achieving sufficient contact in the receptacle 10 to obtain the required moisture pick up will be conducive to optimum vaporization at a remote point of application where the gaseous fluids are generally inhaled at atmospheric pressure. The operation of applicant's humidifier device achieves this end and has been demonstrated to produce very favorable therapeutic results.

Returning now to the cover 15, for most purposes it has been found advisable in a humidifier apparatus to provide a pressure relief valve. Such a valve is illustrated at 60 and comprises a simple spring check valve arrangement secured to the cover 15 by an upper shoulder 61 and a lower lock nut 62. A gasket 63 may be positioned at the juncture of cover 15 and shoulder 61 for sealing purposes. The internal spring, not shown, is adjusted to relieve at very low pressures, in the order of from a few ounces to one pound per square inch. The device is preferably provided with some audible arrangement in an outlet orifice 64, for example a whistle, not shown, to signal the occurrence of a pressure increase. It is also found preferable for medical purposes that indicia of measure, not shown, in some convenient units, such as cubic centimeters, be embossed on the surface of the receptacle 10 so that, due to the transparent nature of the receptacle 10, the amount of liquid in the receptacle can be readily ascertained at all times. Other indicia, such as operating instructions, may also appear on the receptacle.

Applicant's diffuser type vaporizer obviously has uses other than in the medical field. The embodiment illustrated, is a highly efficient diffuser, particularly adapted for medical purposes. It will be understood that modifications will be apparent to those skilled in the art, and it is intended that all such modifications within the spirit of this invention are included within its scope, best defined by the appended claims.

I claim:

1. In vaporizing apparatus for inhalation purposes the combination comprising: a liquid container having a cover mounted in gas sealing relation therewith; means including an inlet passage in said container for delivering gaseous fluid initially under pressure into the interior of said container; means to connect a source of gaseous fluid to said inlet passage; a tubular member in communication with said inlet passage extending into a lower portion of the interior of said container; means for diffusing bubbles of gaseous fluid in predetermined radial directions through liquid in said container including a hollow cylindrical diffuser body mounted at the lower end of said tubular member in communication therewith, said body being centrally disposed in said container adjacent its bottom, the location of said body near the bottom of said container substantially ensuring its complete immersion in liquid during a vaporizing operation, a horizontally extending flat shoulder portion of substantial area projecting from said body around its periphery at a lower portion thereof; a plurality of longitudinally spaced, circumferentially staggered apertures extending through the walls of said body, one of said apertures being located at the juncture between said body and said shoulder portion, a plurality of flat washers of substantial area, equal in number to said apertures, stacked one upon the other defining interfaces of substantial area between adjacent washers, said washers relatively closely encircling said diffuser body supported upon said shoulder portion in covering relation with said apertures and being relatively movable toward and away from said shoulder portion, the interfaces between adjacent washers being aligned with respective apertures when said washers are in contact with each other and the lowermost is in contact with said shoulder portion, the flow of gaseous fluid under pressure through said apertures against the lower edges of said washers and under their lower surfaces causing the respective washers to move upwardly relative to said shoulder portion against the force of gravity, uncovering said apertures and permitting gaseous fluid to emerge from the respective apertures, the respective washers reciprocatingly covering and uncovering said apertures under the concurrent influence of gravity and gaseous fluid flowing from said apertures under pressure, the emerging gaseous fluid forming bubbles between the surfaces of adjacent washers and between the lower surface of said lowermost washer and said shoulder portion, the staggered arrangement of the apertures ensuring that bubbles from the respective apertures will be uniformly diffused through liquid in the container in a predetermined radial pattern, whereby gaseous fluid diffused into and travelling through said liquid entrains a relatively high degree of vaporized liquid; and an outlet passage for vapor entrained gaseous fluid extending from the inside to the outside of said container.

2. In vaporizing apparatus for inhalation purposes the combination comprising: a liquid container having a cover mounted in gas sealing relation therewith; means including an inlet passage in said container for delivering gaseous fluid initially under pressure into the interior of said container; means to connect a source of gaseous fluid to said inlet passage; a tubular member in communication with said inlet passage extending into a lower portion of the interior of said container; means for diffusing bubbles of gaseous fluid in predetermined radial directions through liquid in said container including a hollow cylindrical diffuser body mounted at the lower end of said tubular member in communication therewith, said body being centrally disposed in said container adjacent its bottom, the location of said body near the bottom of said container substantially ensuring its complete immersion in liquid during a vaporizing operation, a horizontally extending flat shoulder portion of substantial area projecting from said body around its periphery at a lower portion thereof; a plurality of longitudinally spaced, circumferentially staggered apertures extending through the walls of said body, a plurality of flat washers of substantial area, equal in number to said apertures, stacked one upon the other defining interfaces of substantial area between adjacent washers, said washers relatively closely encircling said diffuser body supported upon said shoulder portion in covering relation with said apertures and being relatively movable toward and away from said shoulder portion, the interfaces between adjacent washers being aligned with respective apertures when said washers are in contact with each other and the lowermost is in contact with said shoulder portion, the flow of gaseous fluid under pressure through said apertures against the lower edges of said washers and under their lower surfaces causing the respective washers to move upwardly relative to said shoulder portion against the force of gravity, uncovering said apertures and permitting gaseous fluid to emerge from the respective apertures, the respective washers reciprocatingly covering and uncovering said apertures under the concurrent influence of gravity and gaseous fluid flowing from said apertures under pressure, the emerging gaseous fluid forming bubbles between the surfaces of adjacent washers, the staggered arrangement of the apertures ensuring that bubbles from the respective apertures will be uniformly diffused through liquid in the container in a predetermined radial pattern, whereby gaseous fluid diffused into and travelling through said liquid entrains a relatively high degree of vaporized liquid; and an outlet passage for vapor entrained gaseous fluid extending from the inside to the outside of said container.

References Cited in the file of this patent
UNITED STATES PATENTS

| | | |
|---|---|---|
| 1,969,644 | Gavett | Aug. 7, 1934 |
| 1,971,288 | Wheeler | Aug. 21, 1934 |
| 2,080,940 | Traudt | May 18, 1937 |
| 2,378,029 | O'Brien | June 12, 1945 |
| 2,415,048 | Sharp | Jan. 28, 1947 |
| 2,668,699 | Szekely | Feb. 9, 1954 |
| 2,687,287 | Coppock | Aug. 24, 1954 |